(12) United States Patent
Oh et al.

(10) Patent No.: US 8,243,632 B1
(45) Date of Patent: Aug. 14, 2012

(54) USE OF DUAL ASYMMETRIC WIRELESS LINKS TO PROVIDE BI-DIRECTIONAL HIGH DATA RATE WIRELESS COMMUNICATION

(75) Inventors: Dae-Sik Oh, Overland Park, KS (US);
Tim W. Sill, Palette City, MO (US);
Thomas M. Steele, Shawnee, KS (US);
Saad Z. Asif, Kansas City, MO (US);
Leo R. Anderson, Jr., Raymoore, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1865 days.

(21) Appl. No.: 11/212,067

(22) Filed: Aug. 25, 2005

(51) Int. Cl.
*H04B 7/00* (2006.01)
*H04W 4/00* (2009.01)
*H04L 12/28* (2006.01)
*H04J 3/16* (2006.01)

(52) U.S. Cl. ......... 370/277; 370/329; 370/431; 370/468

(58) Field of Classification Search .................. 370/277, 370/310, 310.2, 328, 338, 431, 468, 464
See application file for complete search history.

(56) References Cited

U.S. PATENT DOCUMENTS

| | | | | |
|---|---|---|---|---|
| 5,280,472 A * | 1/1994 | Gilhousen et al. | ............. | 370/335 |
| 5,754,961 A * | 5/1998 | Serizawa et al. | ............... | 455/517 |
| 6,016,311 A * | 1/2000 | Gilbert et al. | ................... | 370/280 |
| 6,038,221 A * | 3/2000 | Wickman et al. | ............. | 370/280 |
| 6,198,730 B1 * | 3/2001 | Hogberg et al. | ............. | 370/320 |
| 6,246,695 B1 * | 6/2001 | Seazholtz et al. | ............. | 370/468 |
| 6,366,589 B1 * | 4/2002 | Naudus et al. | ................. | 370/468 |
| 6,778,517 B1 * | 8/2004 | Lou et al. | ....................... | 370/338 |
| 6,839,333 B1 * | 1/2005 | Åkerberg | ....................... | 370/330 |
| 6,956,836 B2 * | 10/2005 | Chen et al. | ...................... | 370/330 |
| 6,975,603 B1 * | 12/2005 | Dicker et al. | ................. | 370/329 |
| 6,980,531 B1 * | 12/2005 | Rudrapatna | ................... | 370/323 |
| 7,266,130 B2 * | 9/2007 | Lee et al. | ....................... | 370/466 |
| 7,386,036 B2 * | 6/2008 | Pasanen et al. | ................ | 375/211 |
| 7,453,881 B2 * | 11/2008 | Tzannes et al. | ............ | 370/395.1 |
| 2002/0173277 A1 * | 11/2002 | Takao et al. | ...................... | 455/77 |
| 2003/0207668 A1 * | 11/2003 | McFarland et al. | .......... | 455/3.01 |
| 2005/0007987 A1 * | 1/2005 | Yagi et al. | ...................... | 370/347 |
| 2005/0053026 A1 * | 3/2005 | Mullan et al. | ................ | 370/316 |
| 2005/0117559 A1 * | 6/2005 | Malladi et al. | ................ | 370/342 |
| 2007/0036121 A1 * | 2/2007 | Cherian et al. | ................ | 370/342 |
| 2007/0042772 A1 * | 2/2007 | Salkini et al. | ................. | 455/431 |
| 2007/0281728 A1 * | 12/2007 | Charriere et al. | ............. | 455/522 |

OTHER PUBLICATIONS

Overview of 3GPP Release 6 V0.1.1 (Feb. 2010).

* cited by examiner

*Primary Examiner* — Warner Wong

(57) ABSTRACT

To provide high-data-rate wireless communication in both directions between a pair of nodes, the present invention provides for operating at least two asymmetric wireless connections in parallel but in reverse directions between the nodes. One of the asymmetric wireless connections will provide a high-data-rate forward link in one direction between the nodes, while the other asymmetric wireless connection will concurrently provide a high-data-rate forward link in the other direction between the nodes. The lower-data-rate reverse links provided by the asymmetric wireless connections can then be used to carry overhead control data or can be used to supplement the primary high-data-rate communication provided by the forward links. Preferably, 1xEV-DO will be used for both asymmetric wireless data links, but other asymmetric air interface protocols could be used instead.

20 Claims, 5 Drawing Sheets

USE OF DUAL ASYMMETRIC WIRELESS LINKS TO PROVIDE BI-DIRECTIONAL HIGH DATA RATE WIRELESS COMMUNICATION

FIELD OF THE INVENTION

The present invention relates to wireless communications and more particularly to providing high speed wireless data communication. The invention can be usefully employed to provide improved wireless backhaul communication between a pair of network nodes.

BACKGROUND

In a typical cellular radio communications system (wireless communication system), an area is divided geographically into a number of cell sites and sectors, each defined by a radio frequency (RF) radiation pattern from a respective base transceiver station (BTS) antenna. The base station antennae in the cells are in turn coupled to a base station controller (BSC), which is then coupled to a telecommunications switch or gateway, such as a mobile switching center (MSC) or packet data serving node (PDSN) for instance. The switch or gateway may then be coupled with a transport network, such as the Public Switched Telephone Network (PSTN) or a packet-switched network (e.g., the Internet).

When a mobile station (i.e., any wirelessly equipped client device (whether movable or in fixed position), such as a cellular telephone, pager, or appropriately equipped portable computer or personal digital assistant, for instance) is positioned in a cell, the mobile station communicates via an RF air interface with the BTS antenna of the cell. Consequently, a communication path can be established between the mobile station and the transport network, via the air interface, the BTS, the BSC and the switch or gateway.

Data communications over the air interface between a mobile station and a base station generally proceed according to a designated air interface protocol, such as Code Division Multiple Access (CDMA), Time Division Multiple Access (TDMA), Global System for Mobile Communications (GSM), or any other air interface protocol now known or later developed. Air interface communications from the base station to the mobile station constitute "forward link" or "downlink" communications, while those from the mobile station to the base station constitute "reverse link" or "uplink" communications.

The speed or rate at which data is transmitted between a base station and a mobile station can vary from protocol to protocol and can further vary based on a number of factors, such as propagation loss, building and landscape obstructions, and multi-path fading for instance.

Certain air interface protocols provide for largely symmetric communication between a base station and a mobile station, in that the data rate provided on the forward link is substantially similar to the data rate provided on the reverse link. CDMA 1xRTT (1xRTT) is an example of such a symmetric protocol.

As defined by well known industry standards such as IS-2000 for instance, 1xRTT allows multiple mobile stations in a cell sector to communicate on the same frequency and at the same time as each other. Communications between the base station and a given mobile station are distinguished from those between the base station and other mobile stations by modulating the communications with one or more codes unique to the mobile station. Each forward link traffic channel, for instance, is defined in part by modulating with a "Walsh Code" assigned for use by the mobile station. And each reverse link traffic channel is defined in part by modulating with a "long code" associated with the mobile station. Fundamental traffic channels under 1xRTT generally support up to 9.6 kbps or 14.4 kbps respectively on both the forward link and reverse link, although supplemental traffic channels can also be used (on both the forward link and reverse link) to moderately increase the data rate.

Other air interface protocols, in contrast, provide for largely asymmetric communication of data, by providing a substantially higher data rate on the forward link than on the reverse link. Such air interface protocols leverage the fact that, with most IP traffic, the forward link carries a heavier load than the reverse link (as users tend to download far more than they upload). CDMA 1xEV-DO (EV-DO) is an example of such an asymmetric protocol.

In a EV-DO system, as defined by well known industry standard IS-856 for instance, the forward link uses time division multiplexing, in order to allocate all of the transmission power in a sector to a given mobile station at any moment, while the reverse link retains largely the traditional 1xRTT code division multiplexing format, albeit with the addition of a "data rate control" (DRC) channel used to indicate the supportable data rate and best serving sector for the forward link. The end result is that an EV-DO forward link data rate can theoretically support from 38.4 kbps to 3.1 Mbps, while the EV-DO reverse link is limited to the lower data rate more typically provided by 1xRTT. In addition, EV-DO provides an "always on" connection, in which a mobile station can quickly engage in wireless data communications. This "always on" connection mode, combined with EV-DO's high speed forward link, makes EV-DO an attractive alternative to more traditional wireline data communications.

While wireless data communications are most often used to facilitate communication between end-user devices (such as cell phones) and base stations, the industry has also recognized that wireless data communications can be advantageously used to provide wireless backhaul communications between network components. By way of example, rather than incurring the expense of installing and maintaining a T1 line or other landline connection extending from a BSC to a BTS, a wireless carrier can set up a wireless data connection such as a 1xRTT or EV-DO connection from the BSC to the BTS. To do so, the wireless carrier may equip the BSC with an antenna and circuitry to function largely like a base station, and the carrier may equip the BTS with circuitry (and another antenna, if necessary) to function largely like a mobile station (albeit fixed). Backhaul data (including bearer traffic and overhead control data) can then flow wirelessly between the BSC and the BTS. Similarly, a wireless backhaul connection can be provided to extend coverage from a BTS out to a remote BTS or distributed antenna system (DAS), by setting up the remote BTS or DAS to function largely like a mobile station so as to receive data wirelessly from the serving BTS.

SUMMARY

The present invention stems from a realization that, in certain situations, it would be desirable to provide high data rate wireless communications bi-directionally between a pair of nodes.

A prime example of such a situation is where backhaul data needs to be carried bi-directionally between an aircraft and a ground base station, to support use of cell phones or other mobile stations within the aircraft. As envisioned by the industry, to provide aircraft-based cellular communication service, a wireless transceiver may be mounted to the belly of an airplane and set to interface (i) with a "pico-BTS" within the aircraft or directly with mobile stations within the aircraft and (ii) wirelessly with conventional ground-based BTSs. In practice, the transceiver could then receive data transmitted by aircraft-based mobile stations and forward that data over the air interface to a currently-serving ground-based BTS, and the transceiver could similarly receive data over the air interface from the ground-based BTS and forward that data into the aircraft for receipt by one or more mobile stations.

Another, analogous situation is where backhaul data needs to be carried between a BTS and a remotely located DAS (which may essentially include a pico-BTS). Like the scenario described above, a wireless transceiver can be provided at the DAS and can be set to interface (i) with the DAS or directly with mobile stations served by the DAS and (ii) over an air interface with the serving BTS. That way, the transceiver can receive data transmitted by DAS-based mobile stations and forward that data over the air interface to the serving BTS, and the transceiver can similarly receive data over the air interface from the serving BTS and forward that data into the DAS for receipt by one or more mobile stations.

Unfortunately, existing symmetric air interface protocols such as 1xRTT can be too restrictive for this type of application, because such protocols typically provide a relatively low data rate on both the forward and reverse links. On the other hand, asymmetric air interface protocols such as EV-DO are also restrictive for this type of application, because such protocols are, by their very nature, designed to provide high data rate communications on only the forward link and to provide a relative low data rate on the reverse link.

To provide high-data-rate wireless communication in both directions between a pair of nodes, the present invention provides for operating at least two asymmetric wireless connections in parallel but in reverse directions between the nodes. One of the asymmetric wireless connections will provide a high-data-rate forward link in one direction between the nodes, while the other asymmetric wireless connection will concurrently provide a high-data-rate forward link in the other direction between the nodes. The lower-data-rate links provided by the asymmetric wireless connections can then be used to carry overhead control data or can be used to supplement the primary high-data-rate communication provided by the forward links.

An exemplary embodiment of the invention may thus take the form of a method that includes (i) providing a first asymmetric wireless data link between a first node and a second node, the first asymmetric wireless data link defining a first high-data-rate link extending from the first node to the second node and a first low-data-rate link extending from the second node to the first node, (ii) providing a second asymmetric wireless data link between the second node and the first node, the second asymmetric wireless data link defining a second high-data-rate link extending from the second node to the first node and a second low-data-rate link extending from the first node to the second node, and (iii) concurrently operating the first asymmetric wireless data link and the second asymmetric wireless data link so as to provide bi-directional high-data-rate wireless communication between the first node and the second node.

In another respect, the exemplary embodiment can take the form of a method that includes (i) providing a first asymmetric wireless data link between a first node and a second node, the first asymmetric wireless data link defining a first link that extends from the first node to the second node and a second link that extends from the second node to the first node, the first link defining a higher data rate than the second link, (ii) providing a second asymmetric wireless data link between the second node and the first node, the second asymmetric wireless data link defining a third link that extends from the second node to the first node and a fourth link that extends from the first node to the second node, the third link defining a higher data rate than the fourth link, and (iii) concurrently operating the first asymmetric wireless data link and the second asymmetric wireless data link so as to provide bi-directional high-data-rate wireless communication between the first node and the second node.

Further, in another respect, the exemplary embodiment can take the form of a bi-directional wireless data communication system that includes (i) a first node having a first cell-site-modem and a first mobile-station-modem and (ii) a second node having a second cell-site-modem and a second mobile-station-modem. Oppositely directed asymmetric wireless data links are then provided between the first node and the second node. In particular, the first cell-site-modem is arranged to send data to the second mobile-station-modem via a first wireless data link, and the second mobile-station-modem is arranged to send data to the first cell-site-modem via a second wireless data link, with the first wireless data link defining a higher data rate than the second wireless data link. In addition, the second cell-site-modem is arranged to send data to the first mobile-station-modem via a third wireless data link, and the first mobile-station-modem is arranged to send data to the second cell site modem via a fourth wireless data link, with the third wireless data link defining a higher data rate than the fourth wireless data link.

These as well as other aspects, advantages, and alternatives will become apparent to those of ordinary skill in the art by reading the following detailed description, with reference where appropriate to the accompanying drawings. Further, it should be understood that this summary and the description provided below are intended to describe the claimed invention by way of example only.

DETAILED DESCRIPTION

Figure 1:
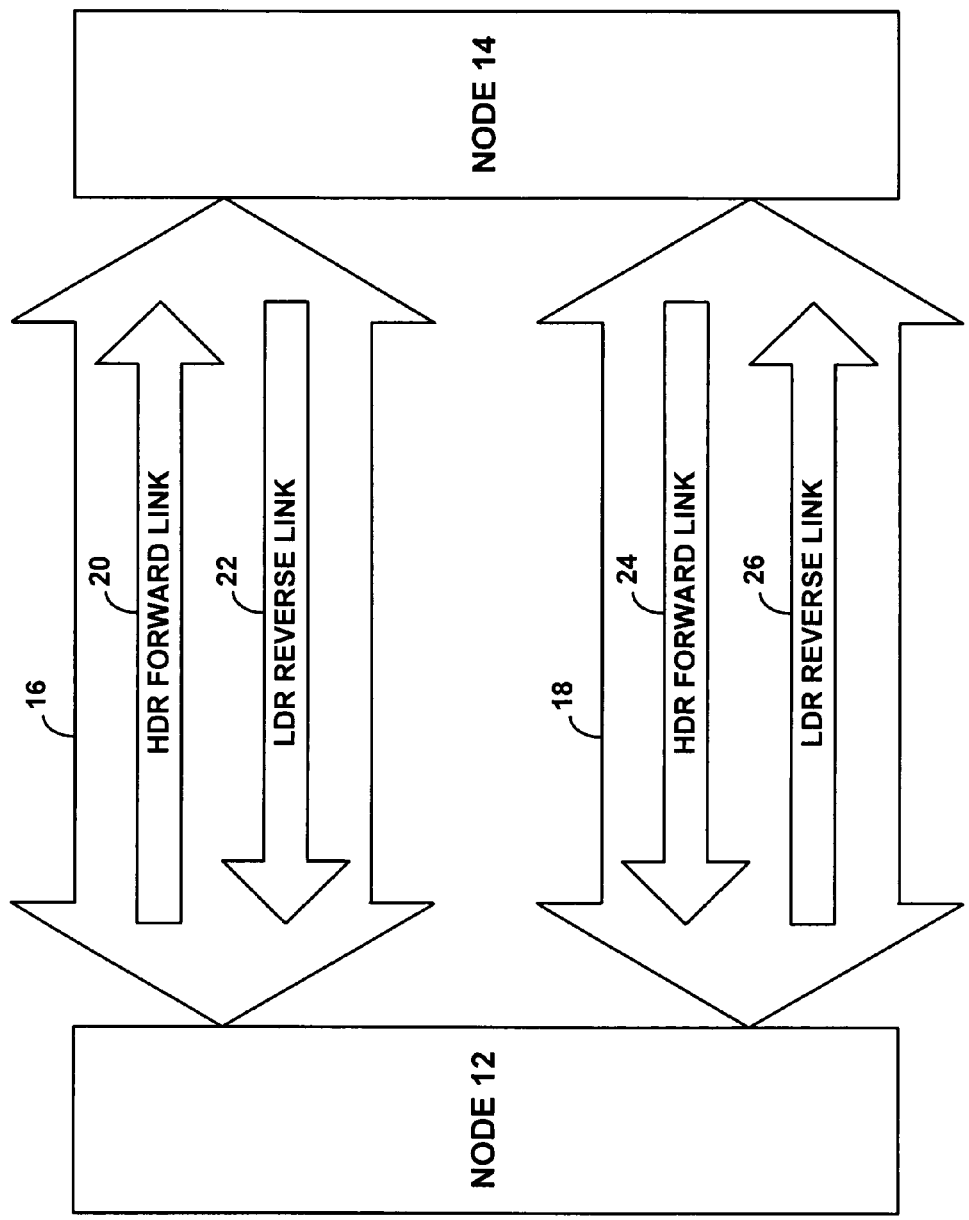
FIG. 1 is block diagram of a communication arranged to operate in accordance with the exemplary embodiment.

Referring to the drawings, FIG. 1 is a generalized block diagram depicting a communication system set to operate in accordance with the exemplary embodiment. As shown in FIG. 1, the communication system includes two nodes 12, 14, which are to engage in bi-directional wireless data communication. (As used herein, the term "data communication" can refer to communication of non-real-time data or alternatively to communication of data representing real-time media such as voice or video.) Two asymmetric wireless data connections 16, 18 are then provided between these nodes. Asymmetric wireless data connection 16 provides a high-data-rate forward link 20 from node 12 to node 14 and a low-data-rate reverse link 22 from node 14 to node 12. Asymmetric wireless data connection 18, on the other hand, provides a high-data-rate forward link 24 from node 14 to node 12 and a low-data-rate reverse link 26 from node 12 to node 14.

With this arrangement, nodes 12 and 14 can engage in bi-directional high-data-rate wireless communication with each other, with forward link 20 providing high-data-rate communication from node 12 to node 14, and forward link 24 providing high-data-rate communication from node 14 to node 12. Preferably, the high-data-rate on forward link 20 will be substantially the same as the high-data-rate on forward link 24, by employing the same air interface protocol for both asymmetric wireless data connections. However, the forward link data rates can differ from each other. In any event, by definition, the forward link of each asymmetric wireless data connection will provide for higher speed data communication than the corresponding reverse link of that connection.

In the preferred embodiment, the forward links of the respective asymmetric wireless data connections can be used to carry the bulk of data communications bi-directionally between nodes 12 and 14. The reverse links of the asymmetric wireless data connections can then be used to supplement the forward link data communications, such as to carry overhead control data. For instance, reverse link 22 of asymmetric wireless data connection 16 can be used to supplement data communications on forward link 20 from node 14 to node 12. Similarly, reverse link 26 of asymmetric wireless data connection 18 can be used to supplement data communications on forward link 24 from node 12 to node 14. Circuitry and/or program logic at the nodes can be programmed to send certain data on a forward link and to send other data on the reverse link. Which data is sent on which link is a matter of design choice.

To provide the arrangement of FIG. 1 in practice, each of nodes 12 and 14 can be equipped to function both as a base station (wireless server) and as a mobile station (wireless client). In this regard, a conventional mobile station is commonly equipped with a "mobile station modem" chipset such as one of the various "MSM" chipsets available from Qualcomm Incorporated, and a base station is commonly equipped with a "cell site modem" chipset such as one of the various "CSM" chipsets available from Qualcom Incorporated. In a manner well known in the art, the mobile station modem and cell site modem chipsets, together with other circuitry and antennas, enable a mobile station and base station to engage in air interface communication with each other according to a designated air interface protocol. As presently contemplated, in order to make each of nodes node 12 and 14 function as both a base station and a mobile station, each node can be equipped with both a cell site modem and a mobile station modem. This arrangement is illustrated generally by FIG. 2.

Figure 2:
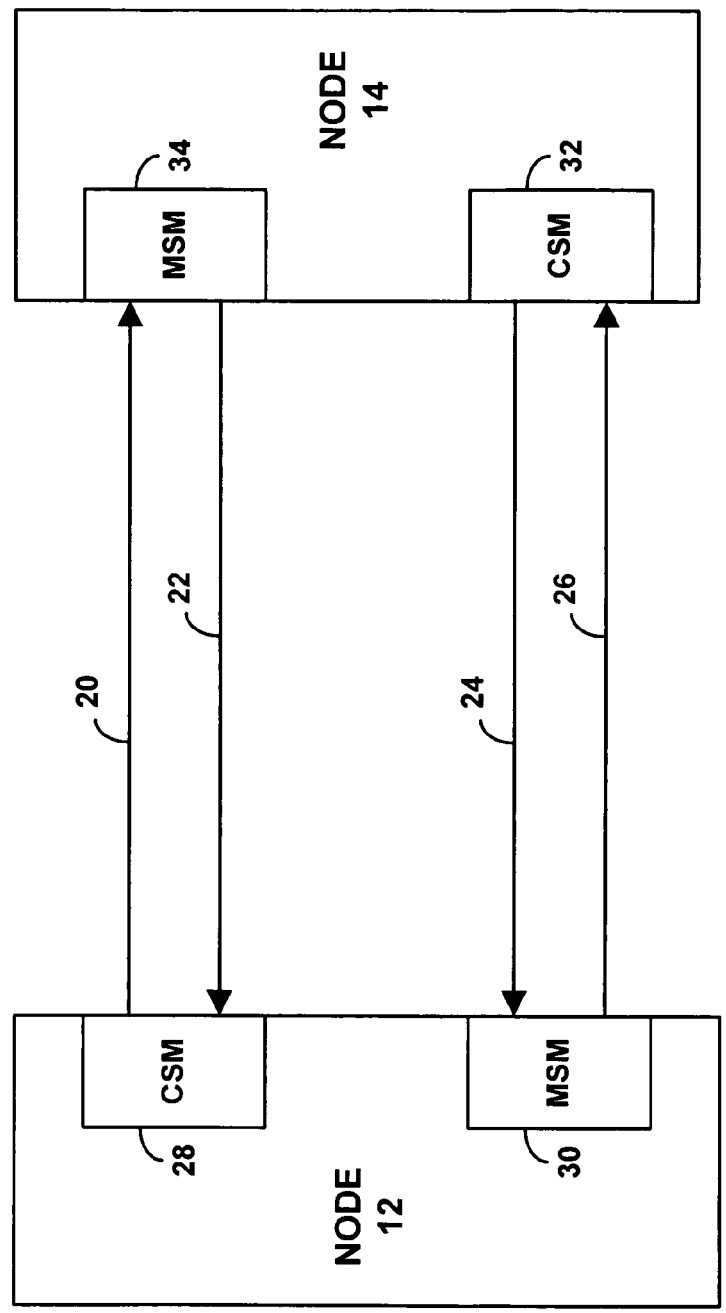
FIG. 2 is a block diagram depicting cell site modems and mobile station modems set to establish dual asymmetric wireless data links in accordance with the exemplary embodiment.

As shown in FIG. 2, node 12 is equipped with a cell site modem 28 and a mobile station modem 30, and node 14 is equipped with a cell site modem 32 and a mobile station modem 34. With this arrangement, cell site modem 28 and mobile station modem 34 will communicate with each other to define asymmetric wireless data connection 16, providing high-data-rate forward link 20 from node 12 to node 14 and low-data-rate reverse link 22 from node 14 to node 12. Further, cell site modem 32 and mobile station modem 30 will communicate with each other to define asymmetric wireless data connection 18, providing high-data-rate forward link 24 from node 14 to node 12, and low-data-rate reverse link 26 from node 12 to node 14.

The bulk of useful data communications in this arrangement will preferably occur over the forward links provided between the nodes. To facilitate this, each node will include control circuitry (not shown) such as a programmed microprocessor or a DSP, that will pass outgoing data communications to the node's cell site modem for transmission to the other node and that will receive incoming data communications transmitted to the node's mobile station modem from the other node. Each node's control circuitry can further provide for exchange of supplemental data, such as overhead control information for instance, over the respective reverse links, receiving such data via the reverse link into its cell site modem, and transmitting such data via the reverse link from its mobile station modem.

The asymmetric air interface protocol used for connection 16 and connection 18 can be any asymmetric air interface protocol desired, including any now known or later developed. Further, the asymmetric air interface protocol used for connection 16 can differ from that used for connection 18. In a preferred embodiment, however, both connections will use the well known EV-DO protocol, which has been defined by TIA/EIA IS-856 and is also known as the "high rate packet data (HRPD) system." Thus, both cell site modems 28, 32 will be cell site modems arranged to support EV-DO communication, and both mobile station modems 30, 34 will be mobile station modems arranged to support EV-DO communications. By way of example, each cell site modem can be a Qualcomm CSM6800™ chipset, and each mobile station modem can be an MSM6800™ chipset. Both the CSM6800™ chipset and MSM6800™ chipset have EV-DO operating modes (e.g., 1xEV-DO Rev. 0 or Rev. A), and each chipset can be programmatically set to operate in that mode.

Under EV-DO, as noted above, the forward link uses time division multiplexing (TDM) in order to allocate all of the sector's forward link power to a given mobile station at any given moment, while the reverse link retains the code division multiplexing (CDM) format of 1xRTT, albeit with the addition of a "data rate control" (DRC) channel used to indicate the supportable data rate and best serving sector for the forward link.

The EV-DO forward link is divided into time slots of length 2048 chips, and each time slot is further time division multiplexed to carry various channels, including a pilot channel, a Medium Access Control (MAC) channel, and, if any traffic exists, a forward traffic channel and a "control" channel. Each EV-DO sector is further defined by a PN offset, and the pilot channel carries an indication of the sector's PN offset. A mobile station operating under EV-DO monitors the pilot signal emitted by various sectors as a basis to facilitate hand-off from one sector to another.

With EV-DO, a mobile station communicates with the network on just a single "best" sector at any given time. Generally, the mobile station will maintain an "active set" list of sectors and will monitor the strength of pilot signals received from the active set sectors. The mobile station will then select the "best" of those sectors, typically the sector having the strongest detected pilot strength, and the mobile station will then include an indication of that sector in its DRC on the reverse link. Only that sector will then serve the mobile station with forward link packets.

Figure 3:
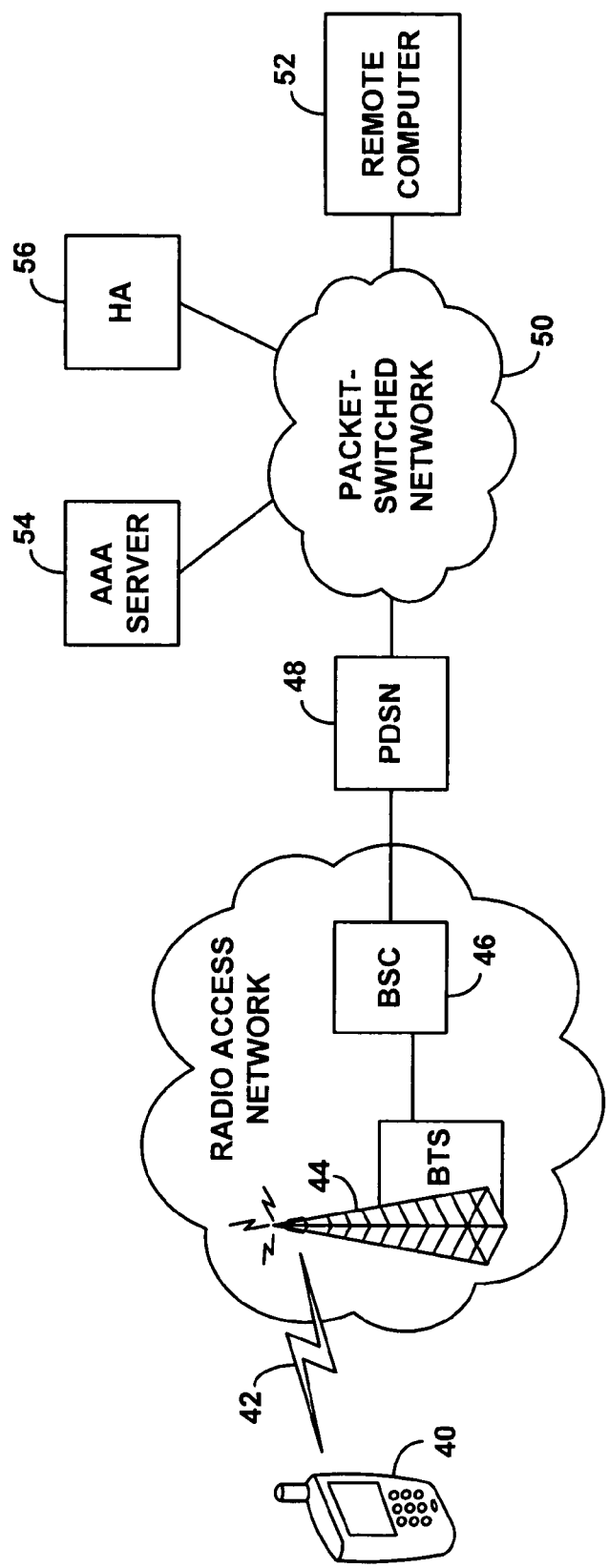
FIG. 3 is a block diagram of a cellular wireless communication system arranged to support wireless packet data communications.

FIG. 3 is a simplified block diagram of a typical network arranged to implement EV-DO. As a basic matter, in the arrangement of FIG. 3, a mobile station 40 communicates over an air interface 42 with a BTS 44, which is then coupled or integrated with a BSC 46. (The BTS and BSC may be referred to separately or in combination as a "base station.") BSC 46 is coupled with a PDSN 48, which provides connectivity with a packet-switched network 50 such as the Internet and/or a wireless carrier's private core packet-network. In a typical arrangement, sitting as nodes on network 50 may then be a remote computer 52, an authentication, authorization, and accounting (AAA) server 54, and a mobile-IP home agent (HA) 56. In basic operation, after the mobile station 40 is authenticated by AAA server 54, HA 56 may assign an IP address for use by the mobile station 12, and the mobile station 12 may then engage in packet-data communications with entities such as remote computer 52, via a communication path comprising air interface 42, BTS 44, BSC 46, PDSN 48, and network 50.

In operation, when a mobile station enters the coverage area of an EV-DO base station, the mobile station will detect a pilot signal emitted by the base station. In response, the mobile station will then transmit on the reverse link to the base station a Universal Access Terminal Identifier (UATI) request. In response to the UATI request, the BSC will then transmit on the forward link to the mobile station an International Mobile Station Identifier (IMSI), which the mobile station can then use to identify itself in subsequent communications with the BSC. In turn, the mobile station will then send a EV-DO Connection-Request to the base station, and the base station will responsively invoke a process to authenticate the mobile station and to have the mobile station acquire a radio link (traffic channel), a data link, and an IP address.

In particular, after authenticating the mobile station, the BSC will then assign radio resources for data communication, by directing the mobile station to operate on a particular time slot of the TDM forward link and by establishing that the mobile station will communicate with a particular long code on the reverse link. Further, the BSC will signal to the PDSN, and the PDSN and mobile station will then negotiate with each other to establish a data link, such as a point-to-point protocol (PPP) session. In addition, the mobile station will send a Mobile-IP registration request (MIP RRQ) message to the PDSN, which the PDSN will forward to the HA, and the HA will assign a mobile-IP address for the mobile station to use. The mobile station 12 may then engage in packet-data communications with entities such as remote computer 52, via a communication path comprising air interface 42, BTS 44, BSC 46, PDSN 48, and network 50.

With the arrangement presently contemplated, node 12 of FIG. 2 can be constructed as a modified version of an existing base station, such as a modified version of the BTS 44 and/or BSC 46 shown in FIG. 3. Conveniently, BTS 44 would already include the cell site modem 28 shown in node 12 of FIG. 2 and would thus already be configured to transmit data on EV-DO forward link 20 to one or more mobile stations and to receive data from one or more mobile stations on EV-DO reverse link 22. Node 14 (i.e., mobile station modem 34) would be one such mobile station.

To function as node 12, the base station will be modified to further include the mobile station modem 30 shown in FIG. 2, so that the base station can receive data from node 14 on EV-DO forward link 24 and can transmit data to node 14 on EV-DO reverse link 26. The mobile station modem 30 added to the base station could be co-located with the base station's existing cell site modem 28, such as in a common equipment cabinet at the base of the antenna tower. Further, the mobile station modem 30 can be set to share antennas with the cell site modem 28 or to use separate antennas.

Node 14, on the other hand, can advantageously be a node to which a wireless carrier wishes to extend EV-DO coverage, such as a node that is located remotely from BTS 44 and that itself serves or provides connectivity for multiple mobile stations. Examples of such remotely located nodes include (i) a wireless transceiver on an aircraft, (ii) a pico-BTS or other wireless transceiver serving a multi-passenger vehicle or located in some other place, and (iii) a wireless transceiver at a distributed antenna system hub. Node 14 can take other forms as well, however, and may even take the form of a handheld mobile station (such as a cell phone or wirelessly equipped PDA or computer).

Node 14 will preferably be configured with the cell site modem 32 shown in FIG. 2, so that node 14 can transmit data on the EV-DO forward link 24 to the mobile station modem 30 of node 12, and so that node 14 can receive data on the EV-DO reverse link 26 from the mobile station modem 30 of node 12. Further, node 14 will preferably be configured with the mobile station modem shown in FIG. 2, so that node 14 can receive data on the EV-DO forward link 20 from the cell site modem 28 of node 12, and so that node 14 can transmit data on the EV-DO reverse link 22 to the cell site modem 28 of node 12.

To avoid interference between air interface communications on asymmetric wireless data connections 16, 18, nodes 12 and 14 will preferably be arranged to use different carrier frequencies for their EV-DO communications on the various links. In particular, they can be set to communicate on one carrier frequency (e.g., one 1.25 MHz channel) for forward link 20 of connection 16, another carrier frequency for reverse link 22 of connection 16, still another carrier frequency for forward link 24 of connection 18, and yet another carrier frequency for the reverse link 26 of connection 18. Alternatively, other arrangements for avoiding interference can be provided.

In the event node 14 is literally mobile, such as if node 14 is mounted on the belly of an aircraft in flight or on some other moving vehicle, multiple nodes 12 can be provided to serve and be served by node 14 as node 14 moves. Each such node 12 would include both a cell site modem 28 and a mobile station modem 30, and a process would be put in place to transfer communications between node 14 and nodes 12 as node 14 moves out of communication with one node 12 and into communication with another node 12.

The conventional handoff process can govern handoff of mobile station modem 34 as node 14 moves out of the coverage of one node 12 and into the coverage of another node 12. In particular, BSC 46 or another entity controlling the cell site modems 28 of the various nodes 12 can control handoff of mobile station modem 34 from one cell site modem 28 to another.

Further, in response to mobile station modem 34 handing off from the cell site modem 28 of one node 12 to the cell site modem of another node 12, control logic at both ends will preferably also transfer the other asymmetric wireless data connection accordingly. In particular, control logic at node 14 will preferably direct cell site modem 32 to begin communicating with the mobile station modem 30 of the new node 12, and control logic at node 12 (e.g., BSC 46) will preferably direct the mobile station modem 30 of the new node 12 to begin communicating with the cell site modem 32 of node 14. To facilitate this, nodes 12 and 14 can use asymmetric wireless data link 16 to exchange radio link parameters needed for set up of the new asymmetric wireless data link 18.

In the preferred embodiment, if node 14 communicates with only one node 12 at a time, node 14 need not employ the complex scheduling algorithm that is commonly employed to manage the EV-DO forward link. Rather, the cell site modem 32 of node 14 can keep its EV-DO forward link open at all times and, as node 14 receives data to transmit to node 12, node 14 can simply transmit that data along the open EV-DO forward link to node 12.

Similarly, if node 12 communicates with only one node 14 at a time, node 12 need not employ the complex scheduling algorithm that is commonly employed to manage the EV-DO forward link. Rather, the cell site modem 28 of node 12 can similarly keep its EV-DO forward link open at all times and, as node 12 receives data to transmit to node 14, node 12 can simply transmit that data along the open EV-DO forward link to node 14.

Figure 4:
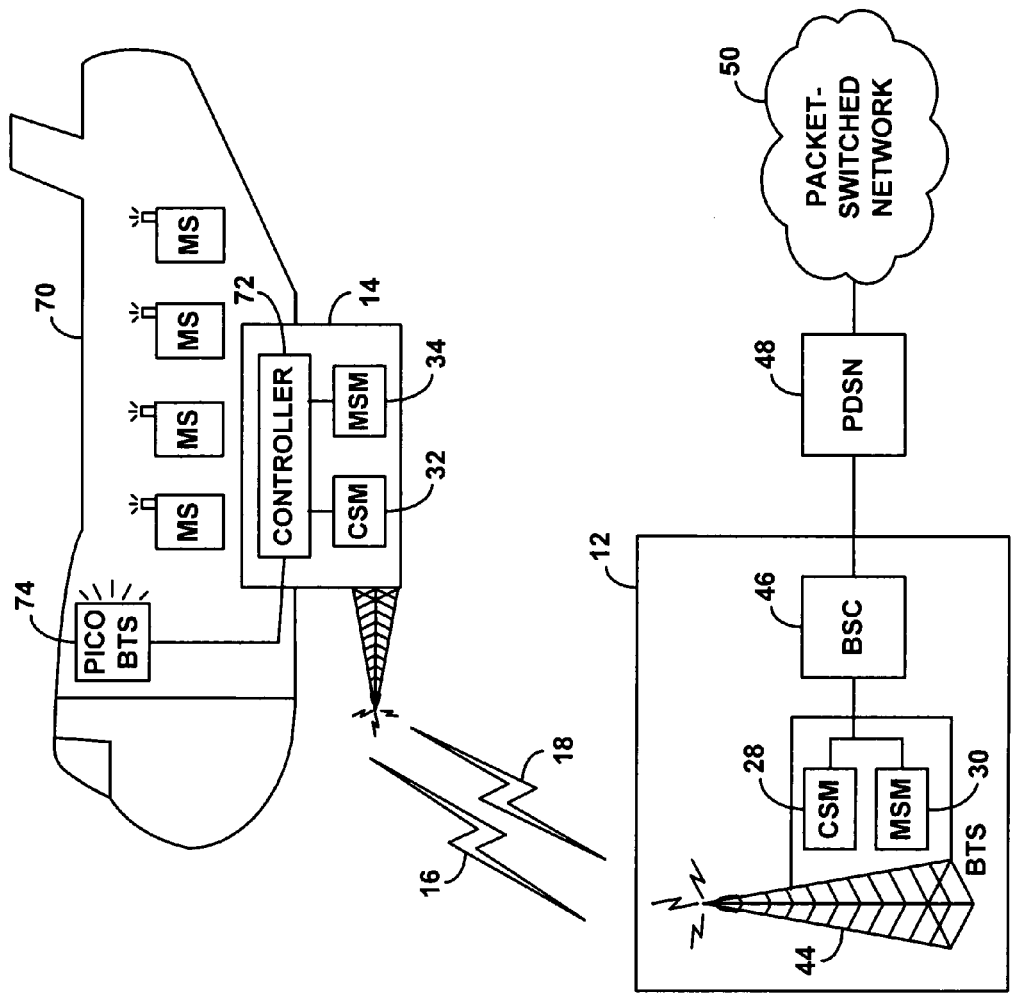
FIG. 4 is an illustration depicting use of dual asymmetric wireless data links to extend high speed wireless service to mobile stations in an aircraft.

FIG. 4 next illustrates how the exemplary embodiment can be implemented to provide bi-directional high-data-rate wireless service for mobile stations within an aircraft. As shown in FIG. 4, an aircraft 70 is configured (internally and/or externally) with a node 14, arranged to include a cell site modem 32 and a mobile station modem 34 as in FIG. 2. The cell site modem 32 and mobile station modem 34 are then connected with a controller 72, which is in turn coupled with a pico-BTS 74 within the aircraft passenger compartment. (Note that, while the aircraft is shown as an airplane, any sort of flying vehicle, or any other sort of vehicle could just as well be provided in its place.) The pico-BTS 74 may then serve a plurality of mobile stations operated by passengers or others within the aircraft.

FIG. 4 further illustrates a ground-based BTS 44, which is arranged to include a cell site modem 28 and a mobile station modem 30. The cell site modem 28 and mobile station modem 30 of ground-based BTS 44 are then connected with a ground-based BSC 46, which is in turn coupled with PDSN 48 as in FIG. 3, so as to provide a connection with packet-switched network 50. As shown, BTS 44 and BSC 46 may cooperatively define a ground-based node 12.

With this arrangement, dual asymmetric wireless data links 16, 18 are provided between ground-based BTS 44 and node 14. In particular, asymmetric wireless connection 16 is provided between the cell site modem 28 of ground-based BTS 44 and the mobile station modem 34 of node 14, and asymmetric wireless connection 18 is provided between the cell site modem 32 of node 14 and the mobile station modem 30 of ground-based BTS 44. Control and bearer data communication may thus pass bi-directionally over high-data rate forward links between the aircraft and the ground.

In operation, for instance, ground-based BTS 44 may transmit a pilot signal to node 14 on either forward link 20 or reverse link 26, controller 72 of node 14 may then forward the pilot signal to pico-BTS 74, and pico-BTS 74 may then broadcast the pilot signal for receipt by the mobile stations within the aircraft. Upon detecting the pilot signal, one or more of the mobile stations may then acquire packet-data connectivity in the manner described above, beginning by sending a UATI request, which pico-BTS 74 would forward to node 14, and node 14 would transmit to ground-based BTS 44 on either forward link 24 or reverse link 22, and carrying on with further communication to acquire radio links, data links, and mobile-IP addresses for communication on network 50.

Once the mobile stations have acquired packet-data connectivity, the mobile stations may then send packet-data destined to particular IP addresses. As the mobile stations transmit such packet-data, pico-BTS 74 would receive the packet-data and forward the packet-data to node 14, and node 14 would transmit the packet-data on high-data-rate forward link 24 to ground-based BTS 44. Ground-based BTS 44 would then pass the packet-data to BSC 46, BSC 46 would pass it to PDSN 48, and PDSN 48 would route it on network 50 to its destination.

Similarly, as BSC 46 receives packet-data destined for the IP address of any of the mobile stations on the aircraft, BSC 46 may pass the packet-data to ground-based BTS 44, and ground-based BTS 44 would transmit the packet-data on high-data-rate forward link 20 to aircraft-based node 14. Node 14 would then pass the packet-data along to pico-BTS 74, and pico-BTS 74 would broadcast the packet-data for receipt by the destination mobile station.

Figure 5:
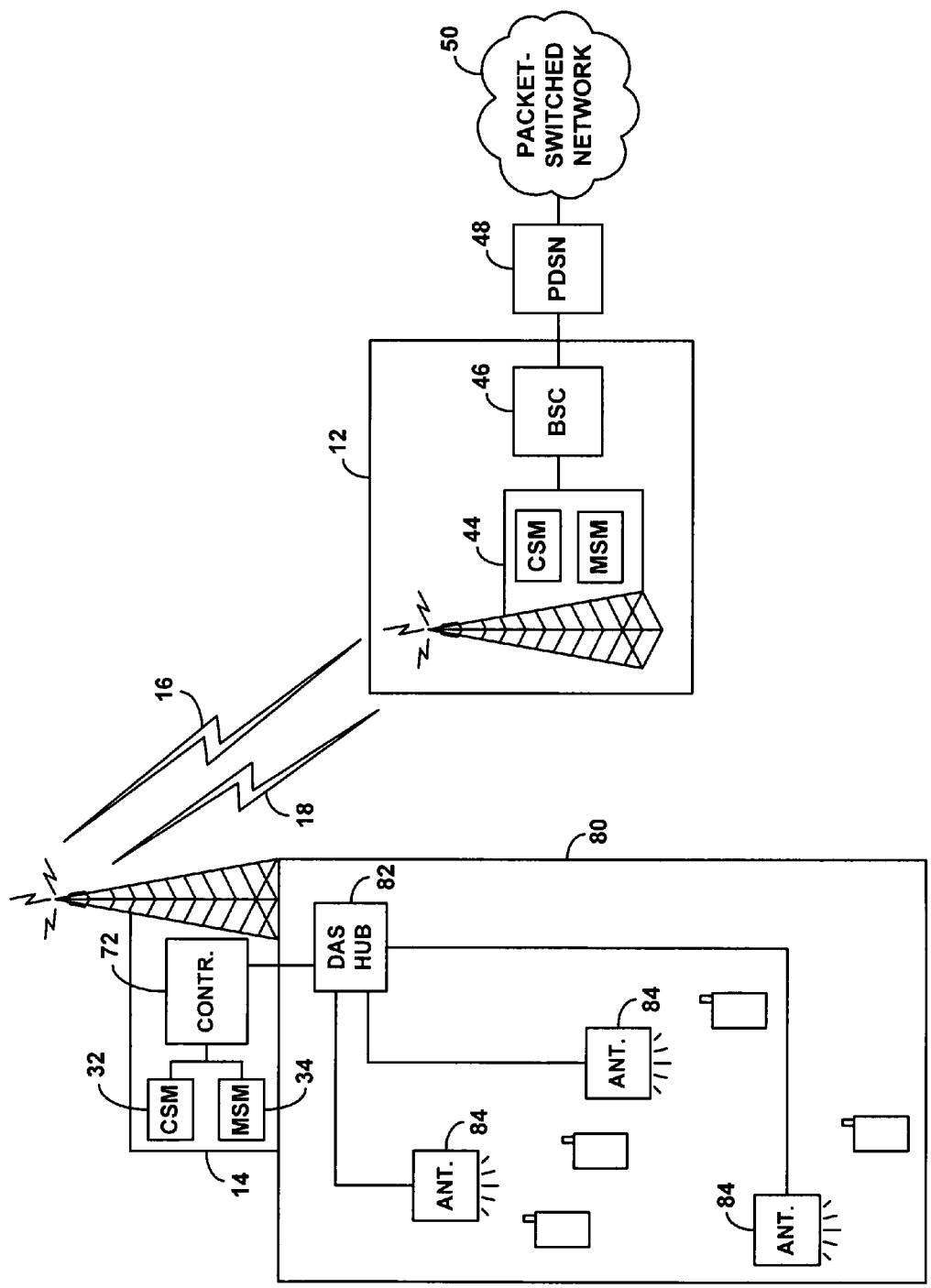
FIG. 5 is an illustration depicting use of dual asymmetric wireless data links to extend high speed wireless service to mobile stations in a distributed antenna system.

Finally, FIG. 5 illustrates how the exemplary embodiment can be implemented to provide bi-directional high-data-rate wireless service for mobile stations within a distributed antenna system (DAS). This situation is analogous to that the scenario depicted in FIG. 4, except that here, node 14 serves a DAS. (In fact, the arrangement of FIG. 4 can be considered to be an aircraft-based DAS as well, but it is shown and described separately here for clarity.)

The DAS of FIG. 5 is shown within an enclosure 80 such as a building. The DAS includes a DAS hub 82, which is connected to a plurality of remotely located DAS antenna units 84. This arrangement thus serves to extend wireless communications within the enclosure, to mobile stations positioned within the coverage of the various DAS antenna units 84. A DAS such as this can be set to operate in a manner well known in the art, either passively repeating communications between DAS hub 82 and the various antenna units 84 or actively routing communications between the DAS hub 82 and certain ones of the antenna units 84.

In the arrangement of FIG. 5, DAS hub 82 is shown coupled with a node 14, which is arranged like the node 14 in FIG. 4 to include a cell site modem 32, a mobile station modem 34, and a controller 72. Further, FIG. 5 illustrates a macro BTS 44, which is arranged as in FIG. 4 to include a cell site modem 28 and a mobile station modem 30. The cell site modem 28 and mobile station modem 30 are then connected with a BSC 46, which is in turn coupled with PDSN 48 as in FIG. 3, so as to provide a connection with packet-switched network 50. As in FIG. 4, BTS 44 and BSC 46 may cooperatively define a node 12.

With this arrangement, BTS 44 may transmit a pilot signal to node 14 on either forward link 20 or reverse link 26, controller 72 of node 14 may then forward the pilot signal to DAS hub 82, DAS hub 82 may forward the pilot signal to the various DAS antenna units 84, and the antenna units 84 may broadcast the pilot signal for receipt by mobile stations within the building 80. Upon detecting the pilot signal, one or more of the mobile stations may then acquire packet-data connectivity in the manner described above, and packet-data may then flow between node 14 and BTS 44 in the manner described above.

Still other example scenarios are possible within the scope of the invention as claimed. For example, dual asymmetric wireless data links can similarly be provided as an improved backhaul connection between the various elements shown in FIG. 3, such as between BTS 44 and BSC 46, or between BSC 46 and PDSN 48, for instance. As another example, dual asymmetric wireless data links can be provided as an improved backhaul connection between base stations and wireless repeaters, between base stations and other base stations, or between various other entities.

An exemplary embodiment of the present invention has been described above. Those skilled in the art will understand, however, that changes and modifications may be made to this embodiment without departing from the true scope and spirit of the present invention, which is defined by the claims.

What is claimed is:

1. A method comprising:
providing a first asymmetric wireless data link between a first node and a second node, wherein the first asymmetric wireless data link defines a first high-data-rate link for carrying data from the first node to the second node and a first low-data-rate link for carrying data from the second node to the first node;

providing a second asymmetric wireless data link between the second node and the first node, wherein the second asymmetric wireless data link defines a second high-data-rate link for carrying data from the second node to the first node and a second low-data-rate link for carrying data from the first node to the second node; and concurrently operating the first asymmetric wireless data link and the second asymmetric wireless data link so as to provide bi-directional high-data-rate wireless communication between the first node and the second node, wherein the first high-data-rate link and the second high-data-rate link both carry forward link communications including communications directed from a given base station to a given mobile station, wherein the first node and the second node function as both the given base station and the given mobile station simultaneously.

2. The method of claim 1, wherein the first high-data-rate link operates on a first frequency channel, and the second high-data-rate link operates on a second frequency channel different than the first frequency channel.

3. The method of claim 1,
wherein the first asymmetric wireless data link comprises a first 1xEV-DO wireless data link with the first high-data-rate link defining a first 1xEV-DO forward-link and the first low-data-rate link defining a first 1xEV-DO reverse-link; and
wherein the second asymmetric wireless data link comprises a second 1xEV-DO wireless data link with the second high-data-rate link defining a second 1xEV-DO forward-link and the second low-data-rate link defining a second 1xEV-DO reverse-link.

4. The method of claim 1,
wherein the first high-data-rate link is a first time division multiplexed link;
wherein the first low-data-rate link is a first code division multiplexed link;
wherein the second high-data-rate link is a second time division multiplexed link; and
wherein the second low-data rate link is a second code division multiplexed link.

5. The method of claim 1, wherein the bi-directional high-data-rate wireless communication comprises backhaul communication between the first node and the second node.

6. The method of claim 5, wherein the first node comprises a cellular base transceiver station (BTS), and the second node serves a distributed antenna system (DAS) located remotely from the cellular BTS.

7. The method of claim 5, wherein the first node comprises a cellular base transceiver station (BTS) and the second node comprises a cellular base station controller (BSC) located remotely from the cellular BTS.

8. The method of claim 5, wherein the first node comprises a first cellular base transceiver station (BTS) and the second node comprises a second cellular BTS or wireless repeater located remotely from the first cellular BTS.

9. The method of claim 1, wherein the first node is ground-based and the second node is aircraft-based.

10. The method of claim 9, further comprising:
receiving aircraft-directed data communications into the first node and transmitting the aircraft-directed data communications wirelessly via the first high-data-rate link from the first node to the second node; and
receiving ground-directed data communications into the second node and transmitting the ground-directed data communications wirelessly via the second high-data-rate link from the second node to the first node.

11. The method of claim 9, further comprising:
receiving into the second node air-to-ground data communications transmitted from one or more aircraft-based mobile stations, and forwarding the air-to-ground data communications from the second node to the first node via the second high-data-rate link; and
receiving into the second node ground-to-air data communications transmitted from the first node via the first high-data-rate link, and forwarding the ground-to-air data communications from the second node to one or more aircraft-based mobile stations.

12. The method of claim 11,
wherein the first asymmetric wireless data link is a first 1xEV-DO wireless data link, with the first high-data-rate link defining a first 1xEV-DO forward-link and the first low-data-rate link defining a first 1xEV-DO reverse-link; and
wherein the second asymmetric wireless data link is a second 1xEV-DO wireless data link, with the second high-data-rate link defining a second 1xEV-DO forward-link and the second low-data-rate link defining a second 1xEV-DO reverse-link.

13. The method of claim 11,
wherein the first high-data-rate link is a first time division multiplexed link;
wherein the first low-data-rate link is a first code division multiplexed link;
wherein the second high-data-rate link is a second time division multiplexed link; and
wherein the second low-data rate link is a second code division multiplexed link.

14. The method of claim 11, wherein each of the one or more mobile stations is operated by an aircraft passenger.

15. The method of claim 1,
wherein providing the first asymmetric wireless data link between the first node and the second node comprises establishing communication between a first cell site modem at the first node and a first mobile station modem at the second node; and
wherein providing the second asymmetric wireless data link between the second node and the first node comprises establishing communication between a second cell site modem at the second node and a second mobile station modem at the first node.

16. A method comprising:
providing a first asymmetric wireless data link between a first node and a second node, wherein the first asymmetric wireless data link defines a first link for carrying data from the first node to the second node and a second link for carrying data from the second node to the first node, the first link defining a higher data rate than the second link;
providing a second asymmetric wireless data link between the second node and the first node, wherein the second asymmetric wireless data link defines a third link for carrying data from the second node to the first node and a fourth link for carrying data from the first node to the second node, the third link defining a higher data rate than the fourth link; and
concurrently operating the first asymmetric wireless data link and the second asymmetric wireless data link so as to provide bi-directional high-data-rate wireless communication between the first node and the second node, wherein the first link and the third link both carry forward link communications including communications directed from a given base station to a given mobile station, wherein the first node and the second node function as both the given base station and the given mobile station simultaneously.

17. The method of claim 16, wherein the first node is ground-based and the second node is aircraft-based.

18. The method of claim 17, further comprising:
receiving into the second node air-to-ground data communications transmitted from one or more aircraft-based mobile stations, and forwarding the air-to-ground data communications from the second node to the first node via the first link; and
receiving into the second node ground-to-air data communications transmitted from the first node via the third link, and forwarding the ground-to-air data communications from the second node to one or more aircraft-based mobile stations.

19. A bi-directional wireless data communication system comprising:
a first node having a first cell site modem and a first mobile station modem;
a second node having a second cell site modem and a second mobile station modem;
wherein the first cell site modem is arranged to send data to the second mobile station modem via a first wireless data link, and the second mobile station modem is arranged to send data to the first cell site modem via a second wireless data link, the first wireless data link defining a higher data rate than the second wireless data link; and
wherein the second cell site modem is arranged to send data to the first mobile station modem via a third wireless data link, and the first mobile station modem is arranged to send data to the second cell site modem via a fourth wireless data link, the third wireless data link defining a higher data rate than the fourth wireless data link,
wherein the first wireless data link and the third wireless data link both carry forward link communications including communications directed from a given base station to a given mobile station, wherein the first node and the second node function as both the given base station and the given mobile station simultaneously.

20. The system of claim 19, wherein the first node is ground-based and the second node is aircraft-based.

* * * * *